June 5, 1951            J. J. PRIESS            2,555,813
DUCK CALL
Filed May 27, 1946
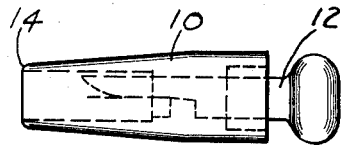
Fig 1
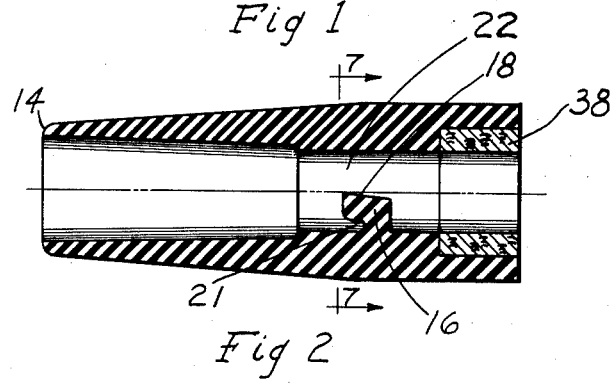
Fig 2
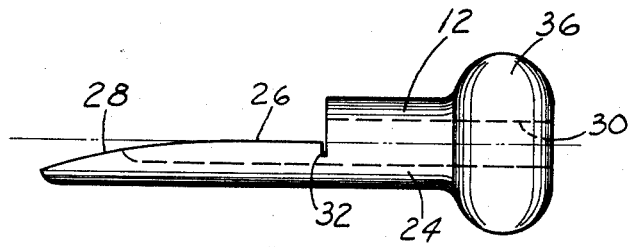
Fig 3
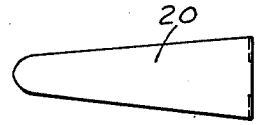
Fig 4
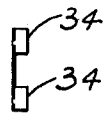
Fig 5
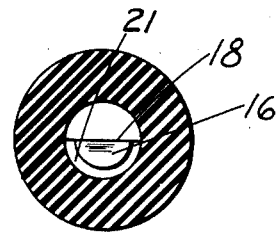
Fig 7
34
Fig 6
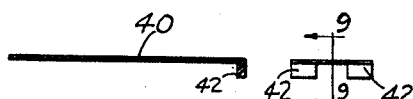
Fig 9
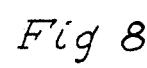
Fig 8
INVENTOR
BY James J. Priess
Soans, Pond & Anderson Patented June 5, 1951

2,555,813

UNITED STATES PATENT OFFICE 2,555,813

DUCK CALL

James J. Priess, Chicago, Ill.

Application May 27, 1946, Serial No. 672,353

4 Claims. (Cl. 46—180)

My invention relates to hunting and includes among its objects and advantages the production of a calling device which can be efficiently operated in use to produce exactly the desired sound and adjusted accurately and conveniently by the user to produce desired variations in sound without complicated manipulation.

A major factor in success in hunting and particularly in hunting wild fowl, resides in the ability of the hunter to duplicate the characteristic noise made by the animal being hunted. For instance, in the case of ducks and many other wild fowl, the characteristic gabbling and squawking can be produced by an experienced hunter by blowing on a reed housed in a tubular body of about the right size and shape. The user's mouth can control the timing and force of the sound and the sound can also be muffled to various degrees by holding the user's hand over the end of the device. It is essential to be able to get just the right pitch and to vary the pitch a little from time to time.

In the accompaying drawing:

Figure 1 is a side elevation of a complete device in which the actual length of the body is about four inches or a little less;

Figure 2 is a longitudinal section on a diametric plane perpendicular to the plane of the reed and bridge;

Figure 3 is a side elevation of the reed support, commonly called the tongue;

Figure 4 is a plan view of a metal reed;

Figure 5 is an end view of the reed of Figure 4;

Figure 6 is a side elevation of the reed of Figure 4;

Figure 7 is a transverse section on line 7—7 of Figure 2;

Figure 8 is an end elevation of a non-metallic reed, and

Figure 9 is a section on line 9—9 of Figure 8.

In the embodiment of the invention selected for illustration, the body 10 receives the reed support 12 in axial sliding relationship, with the support inserted in the outlet end of the body. The inlet end 14 is suitably shaped to engage the mouth of the user. Spaced inward from the outlet end about ⅓ of the length of the body I provide a bridge 16 obstructing substantially half the bore and providing a flat surface at 18 to function as an abutment and fulcrum for the reed 20. As clearly indicated in Figure 2, I prefer to incline the surface 18 at a very small angle, which angle is slightly exaggerated in the drawings for the sake of clearness, so that the maximum pressure against the reed will be at the edge of the bridge facing the user. An angle of three degrees is quite satisfactory for the inclination of the surface 18. I also prefer to fashion a peripheral groove 21 where the bridge joins the body, also facing toward the user, and providing a slight degree of resilience in the bridge. This is particularly desirable when the body is made of transparent or other plastic material which has a large coefficient of thermal expansion. Adjacent the bridge and for a short axial distance on either side thereof I provide a bore portion 22 shaped to fit the reed support with light friction and afford a base of limited length opposite the bridge to carry the pressure exerted by the bridge. The reed support comprises the tubular end portion 24, the flat cutaway portion 26 adjacent the end portion and the inner extension 28 which has a transversely flat surface facing in the same direction as the flat surface of the portion 26 but curved increasingly downward as clearly indicated in Figure 3.

The reed support has the tubular opening 30 which extends axially through the end portion 24 and defines a groove in the portions 26 and 28. The reed 20 overlies this groove and when the parts are properly adjusted and proportioned, the user can blow gently into the inlet end of the assembled caller and cause the reed to vibrate against the curved extension 28 to produce the desired sound.

Means are provided for fastening the reed to its support to slide axially therewith. I have indicated a transverse notch 32 in the face of the portion 26 where it joins the end portion 24, and ears 34 at the corners of the reed adapted to enter said notch.

Means are provided for holding the reed support in position with a degree of friction ample to prevent any accidental displacement but low enough so that the user, by engaging the enlargement 36 at the end of the end portion 24, can easily slide the reed support in and out of the body for a relatively short distance. The sliding movement in an inward direction is limited by abutment of the end portion 24 against the bridge 16 and the outward movement is not limited, but becomes ineffective for pitch regulating purposes when the support is withdrawn so far that the flat portion 26 is completely removed from contact with the bridge and the reed is no longer firmly held. With the parts proportioned substantially as indicated in the drawings it is easy to design such a call for ducks, with a range of adjustment that includes the various pitches needed for duck calling. And readjustment of the proportions, and of the stiffness of the reed 20, is all that is necessary to produce similar devices for calling geese, crows, etc.

The friction means illustrated is a resilient annulus 38 of cork entered in a peripheral groove in the body at the outlet end and of a size to be a snug friction fit on the end portion 24.

The outer configuration of the body is substantially immaterial. I have illustrated a circular configuration.

The non-metallic reed illustrated in Figures 8 and 9 comprises a tongue portion 40 having a configuration in plan view similar to Figure 4 and integral ears 42. Because of the non-metallic construction it is necessary to make the ears 42 somewhat thicker than the body and the notch 32 in the reed support needs to be shaped to fit the ears.

Attempts have been made in the past to produce an adjustable call of this type, but the various expedients employed in an attempt to secure adjustment during use without disassembling the device have not been successful in securing the desired adjustment without impairing the quality of the sound. In spite of these attempts, the vast majority of such devices are still placed in the hands of the user in a condition where the user must take the device apart to adjust it, and in these devices it is an exceedingly tedious and difficult process of repeated trial and error to get a readjustment. Furthermore, the nature of the means employed to support and clamp the reed has been such that each device has to be adjusted by an expert by repeated trial and error and accordingly the production of these devices is still a matter of individual craftsmanship. Experience has shown that a call according to the invention can be produced and assembled in mass production with substantially all the individual devices effective in use. Also, an experienced user, after brief practice, is able to change the pitch instantly in the field so that a little trial and error with respect to the response to the calling enables him to find and use the precise pitch that happens to be most effective under the prevailing conditions of wind and weather and the type of duck flying.

Others may readily adapt the invention for various conditions of use by adopting the novel features disclosed or equivalents thereof. As at present advised, with respect to the apparent scope of my invention, I desire to claim the following subject matter:

1. A bird call, comprising, in combination: a tubular plastic body having a circular bore; said body having an inlet end shaped to engage the mouth of the user and an outlet end; a fixed bridge integral with said body and defining a transverse substantially diametric abutment and obstructing substantially half said bore; a reed support comprising a tube adapted to enter and lie housed in said body; said support including an outer end portion of full cross section adjacent said outlet end, a middle portion next said outer end portion cut away axially on a substantially diametric plane, and an inner end portion constituting a continuation of said middle portion and having its upper face transversely parallel to and longitudinally curved increasingly away from the diametric plane of said middle portion; said middle portion having a transverse notch in its upper face where it joins said outer end portion; a resilient flat metal reed having a portion of maximum width overlying said middle portion and a tapered portion overlying said inner end portion; the wide portion of said reed having ears at its corners entering the notch in said middle support portion; said bridge and middle support portion allowing sufficient clearance to admit said reed gripped firmly between them; the bore of said body being of reduced diameter and fitting said reed support opposite and for a short distance on either side of said bridge; the face of said bridge engaging said reed lying at an acute angle of about 3° to the plane of said reed with its higher end toward the small end of said reed; said bridge having a peripheral groove where it joins said body; said groove facing the inlet end of said bore; the outlet end of said bore being countersunk to form an end portion of increased diameter; a friction packing filling said portion of increased diameter and having snug frictional engagement with the outer end portion of said reed support; the extreme end of said reed support having an enlarged portion to facilitate manipulation thereof; whereby the user's hand placed over the outlet end of said body during use can shift said reed support readily without disassembling any portion of the device.

2. A call, comprising, in combination: a tubular plastic body having an inlet end shaped to engage the mouth of the user, and an outlet end; a fixed bridge in said body and defining a transverse abutment and obstructing part of said bore; a reed support adapted to enter and lie housed in said body; said support including a cutaway portion having a transverse notch in its face; a resilient reed overlying said cutaway portion; the wide portion of said reed having ears at its corners entering the notch in said middle support portion; said bridge and middle support portion allowing sufficient clearance to admit said reed gripped firmly between them; the bore of said body being of reduced diameter and fitting said reed support opposite and for a short distance on either side of said bridge; the face of said bridge engaging said reed lying at an acute angle with its higher end toward the small end of said reed; said bridge having a peripheral groove where it joins said body; said groove facing the inlet end of said bore; the outlet end of said bore being countersunk to form an end portion of increased diameter; a friction packing filling said portion of increased diameter and having snug frictional engagement with the outer end portion of said reed support; the extreme end of said reed support projecting beyond the end of said body; whereby the user's hand placed over the outlet end of said bore during use can shift said reed support readily without disassembling the device.

3. A hunting call comprising, in combination: a body defining a through passage having an inlet end and an outlet end; a reed support smaller than said body and partly telescoped inside said body and projecting from the outlet end of said body; the projecting portion of said reed support being shaped to be manually gripped for adjustment of the position of said reed support; and a stationary reed abutment in said body whereby adjustment of the position of said reed support varies the pitch of said reed; said abutment having a reed-engaging face inclined to the plane of the reed to define a sharp edge at the point where the vibrating portion of the reed is fulcrumed.

4. A hunting call according to claim 3 in which said reed support is fitted into said body with sufficient friction to permit the user to pick up the entire device by grasping either the body or the reed support, without disturbing the adjustment.

JAMES J. PRIESS.

REFERENCES CITED

The following references are of record in the file of this patent:

UNITED STATES PATENTS

| Number | Name | Date |
| --- | --- | --- |
| 468,156 | Pratt | Feb. 2, 1892 |
| 795,493 | Ditto | July 25, 1905 |